United States Patent
Wang

(10) Patent No.: US 10,579,147 B2
(45) Date of Patent: Mar. 3, 2020

(54) RESPONSIVE MOUSE CLICK MECHANISM

(71) Applicant: Voyetra Turtle Beach, Inc., Valhalla, NY (US)

(72) Inventor: Wei-Chuan Wang, Hamburg (DE)

(73) Assignee: ROCCAT GMBH, Hamburg (DE)

( * ) Notice: Subject to any disclaimer, the term of this patent is extended or adjusted under 35 U.S.C. 154(b) by 0 days.

(21) Appl. No.: 16/167,530

(22) Filed: Oct. 23, 2018

(65) Prior Publication Data

US 2019/0250709 A1    Aug. 15, 2019

(30) Foreign Application Priority Data

Feb. 14, 2018   (TW) .............................. 107105404 A

(51) Int. Cl.
| | | |
|---|---|---|
| *G09G 5/08* | (2006.01) | |
| *G06F 3/033* | (2013.01) | |
| *G06F 3/01* | (2006.01) | |
| *G06F 3/0354* | (2013.01) | |
| *G06F 3/02* | (2006.01) | |
| *G06F 3/0338* | (2013.01) | |

(52) U.S. Cl.
CPC ............ *G06F 3/016* (2013.01); *G06F 3/0202* (2013.01); *G06F 3/0338* (2013.01); *G06F 3/03543* (2013.01)

(58) Field of Classification Search
CPC .............. G09G 5/08; G06F 3/033; G06F 3/01
See application file for complete search history.

(56) References Cited

U.S. PATENT DOCUMENTS

| | | | |
|---|---|---|---|
| 6,714,188 B1 | 3/2004 | Zebuhr et al. | |
| 2009/0009473 A1* | 1/2009 | Ho ....................... | G06F 3/03543 345/163 |
| 2010/0171702 A1* | 7/2010 | Cheng ................. | G06F 3/03543 345/163 |
| 2011/0279371 A1* | 11/2011 | Ma ....................... | G06F 3/03543 345/163 |
| 2017/0220139 A1* | 8/2017 | Forde ................... | G06F 3/0202 |

FOREIGN PATENT DOCUMENTS

| | | |
|---|---|---|
| CN | 106933388 A | 7/2017 |
| TW | 490051 U | 6/2002 |
| TW | M515147 U | 1/2016 |

OTHER PUBLICATIONS

Office Action dated Oct. 22, 2018 of the corresponding Taiwan patent application.
Search Report dated May 14, 2019 of the corresponding European patent application.

* cited by examiner

*Primary Examiner* — Pegeman Karimi
(74) *Attorney, Agent, or Firm* — Chun-Ming Shih; HDLS IPR Services

(57) ABSTRACT

A responsive mouse click mechanism includes a body (100), a key (200), and an elastic member (300). A switch (110) is arranged in the body (100). The key (200) includes an extension arm (210), one end of the extension arm (210) is pivotally connected to the body (100), and the other end of the extension arm (210) is in contact with the switch (110). The elastic member (300) is connected between the body (100) and the extension arm (210). The elastic member (300) pushes the extension arm (210) and a moment is thereby loaded on the extension arm (210) to preload pressure on the switch (110) without triggering the switch (110).

11 Claims, 4 Drawing Sheets

RESPONSIVE MOUSE CLICK MECHANISM

BACKGROUND OF THE INVENTION

Field of the Invention

The present disclosure relates to mouse, in particular to a pressure preloaded key responsive mouse click mechanism.

Description of Related Art

A conventional key responsive mouse click mechanism includes a body at least a switch and at least a key corresponding to the switch. The conventional key is a strip, an end of the key is fixed on the body, the other end of the key is arranged above the corresponding switch, and a user can click the suspension end to trigger the switch. According to the aforementioned structure, an elastic resilience force caused by the key also causes a resistant force against to click, and a gap is formed between the key and the switch, there are various type of resistances in the key stroke, and a resultant force of the elastic resilience force and self-resilience force of the switch should be conquered at a destination of the key stroke. Therefore, it is difficult and uncomfortable to click.

In views of this, in order to solve the above disadvantage, the present inventor studied related technology and provided a reasonable and effective solution in the present disclosure.

SUMMARY OF THE INVENTION

A key responsive mouse click mechanism preloaded a pressure is provided in the present disclosure.

A responsive mouse click mechanism including a body, a key and an elastic member is provided in the present disclosure. A switch is arranged on the body. The key includes an extension arm, an end of the extension arm being pivotally connected to the body, and the other end of the extension arm being contacted with the switch. The elastic member is connected between the body and the extension arm, the elastic member presses on the extension arm to cause a moment on the extension arm, and the extension arm being thereby applying a preload on the switch without triggering the switch.

According to the responsive mouse click mechanism of the present disclosure, at least a pivotal notch is defined on the body, a pivotal shaft pivotally connected to the pivotal notch is arranged on the end of the extension arm pivotally connected with the body, and a contact point between the elastic member and the key is located between the pivotal notch and the switch. A cup is arranged between the pivotal shaft and the other end of the extension arm, the elastic member is accommodated in the cup to press on an internal surface of the cup. A pressing plate is arranged on the body, and the pressing plate covers on an opening of the cup and is pressed by the elastic member. A pin is arranged on the pressing plate, the elastic member is a cylindrical spring, the pin is inserted in an end of the elastic member and the other end of the elastic member presses on the internal surface at a bottom of the cup. A bottom of the cup is pushed by the elastic member in a direction opposite to an opening direction of the pivotal notch to press the pivotal shaft into the corresponding pivotal notch.

According to the responsive mouse click mechanism of the present disclosure, at least a couple of coaxial pivotal notches is defined on the body, a couple of coaxial pivotal shafts are arranged on an end of the extension arm pivotally connected with the body, the couple of pivotal shafts are respectively pivotally connected to the respective pivotal notches, the elastic member is arranged between the couple of pivotal notches and a contact point between the elastic member and the key is located between the couple of pivotal notches and the switch. A cup is arranged between the couple of pivotal shafts, the cup is arranged between the couple of pivotal shafts and toward the other end of the extension arm to be offset to one side of an axis of the couple of pivotal shafts, the elastic member is accommodated in the cup and presses on an internal surface of the cup. A pressing plate is arranged on the body, and the pressing plate covers on an opening of the cup and pressed by the elastic member. A pin is arranged on the pressing plate, the elastic member is a cylindrical spring, the pin is inserted in an end of the elastic member and the other end of the elastic member presses on the internal surface at a bottom of the cup. A bottom of the cup is pushed by the elastic member in a direction opposite to an opening direction of the pivotal notch to press the pivotal shaft into the corresponding pivotal notch.

According to the responsive mouse click mechanism of the present disclosure, a pushing block for pressing the switch is arranged protruding on a lateral surface of the extension arm.

According to the responsive mouse click mechanism of the present disclosure, the extension arm is pushed by the elastic member to prepress on the extension arm without triggering the switch, and the switch is thereby preload a pressure thereon. Accordingly, a could slightly click the extension arm to trigger the switch.

BRIEF DESCRIPTION OF DRAWING

The present disclosure can be more fully understood by reading the following detailed description of the embodiment, with reference made to the accompanying drawings as follows.

DETAILED DESCRIPTION OF EMBODIMENT

Figure 1:
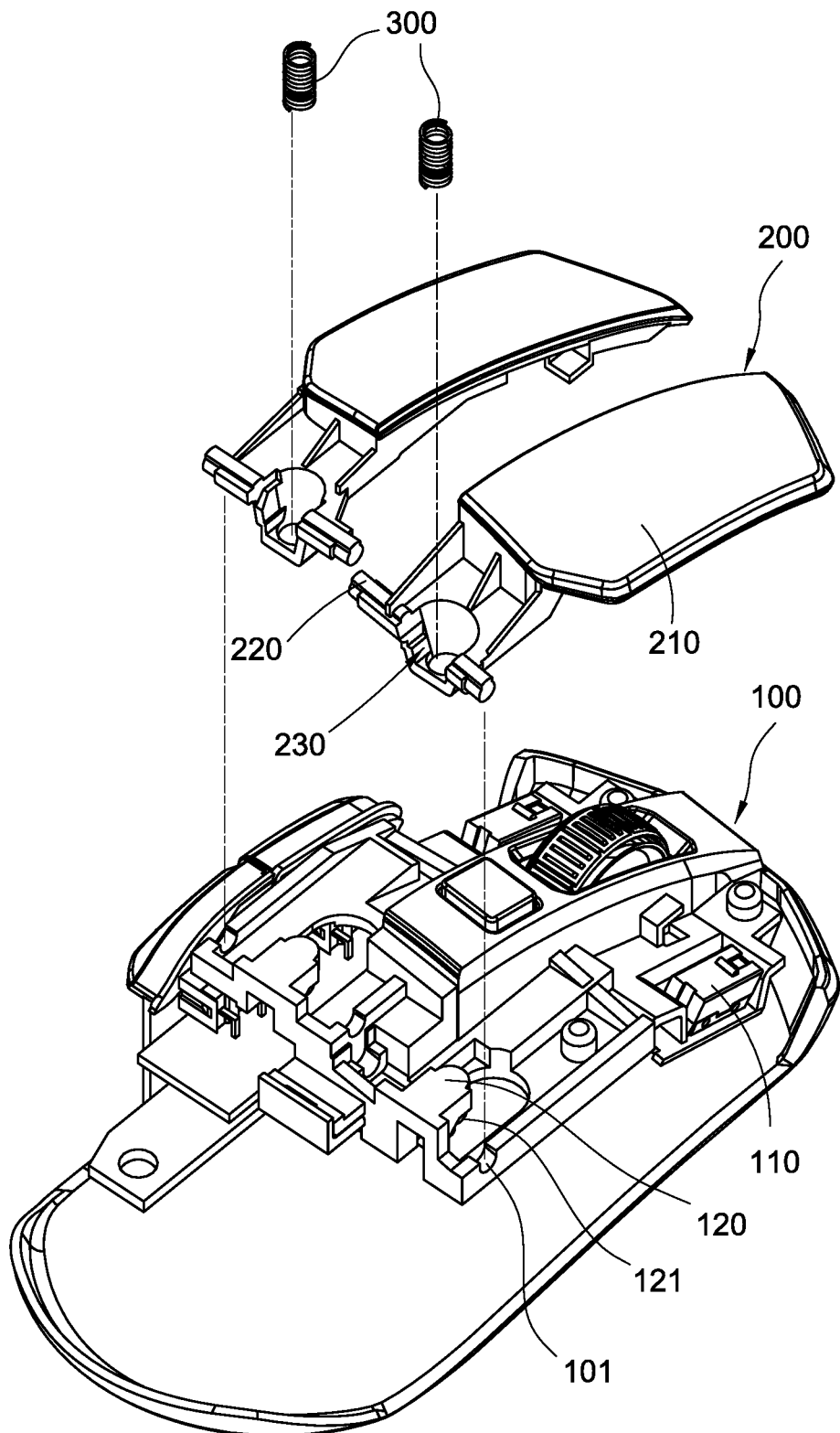
FIG. 1 is an exploded view showing the responsive mouse click mechanism of an embodiment of the present disclosure.
Figure 2:
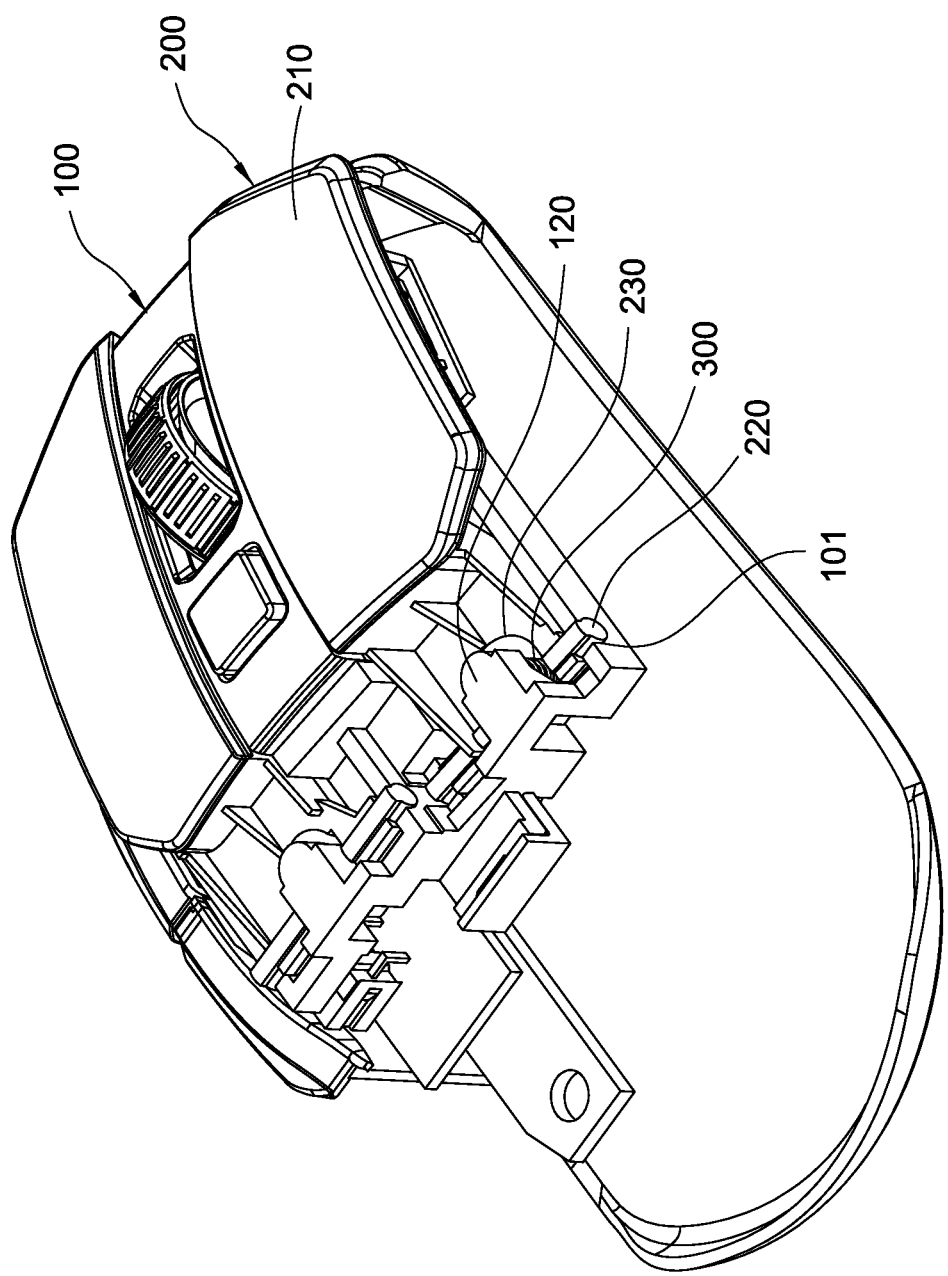
FIG. 2 is a perspective view showing the responsive mouse click mechanism of an embodiment of the present disclosure.
Figure 3:
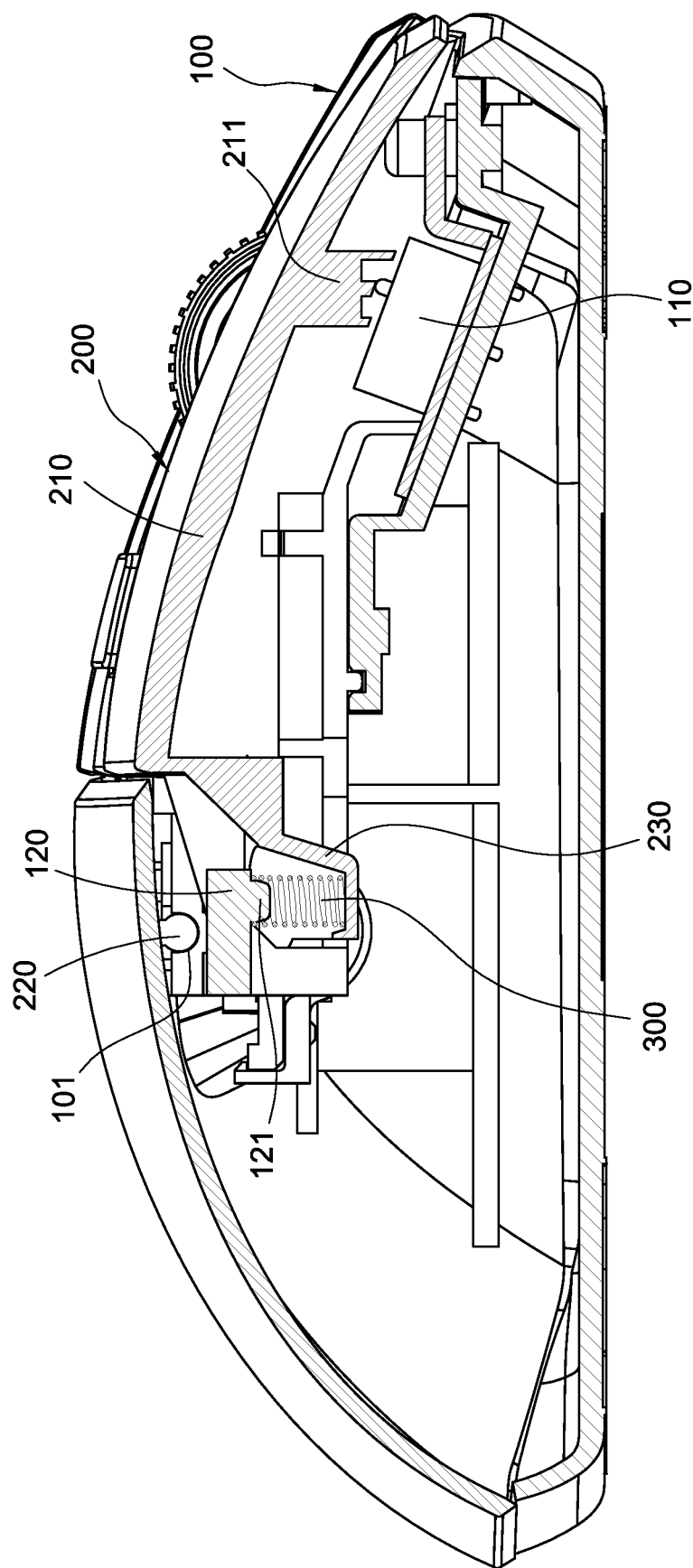
FIG. 3 is a sectional view showing the responsive mouse click mechanism of an embodiment of the present disclosure.
Figure 4:
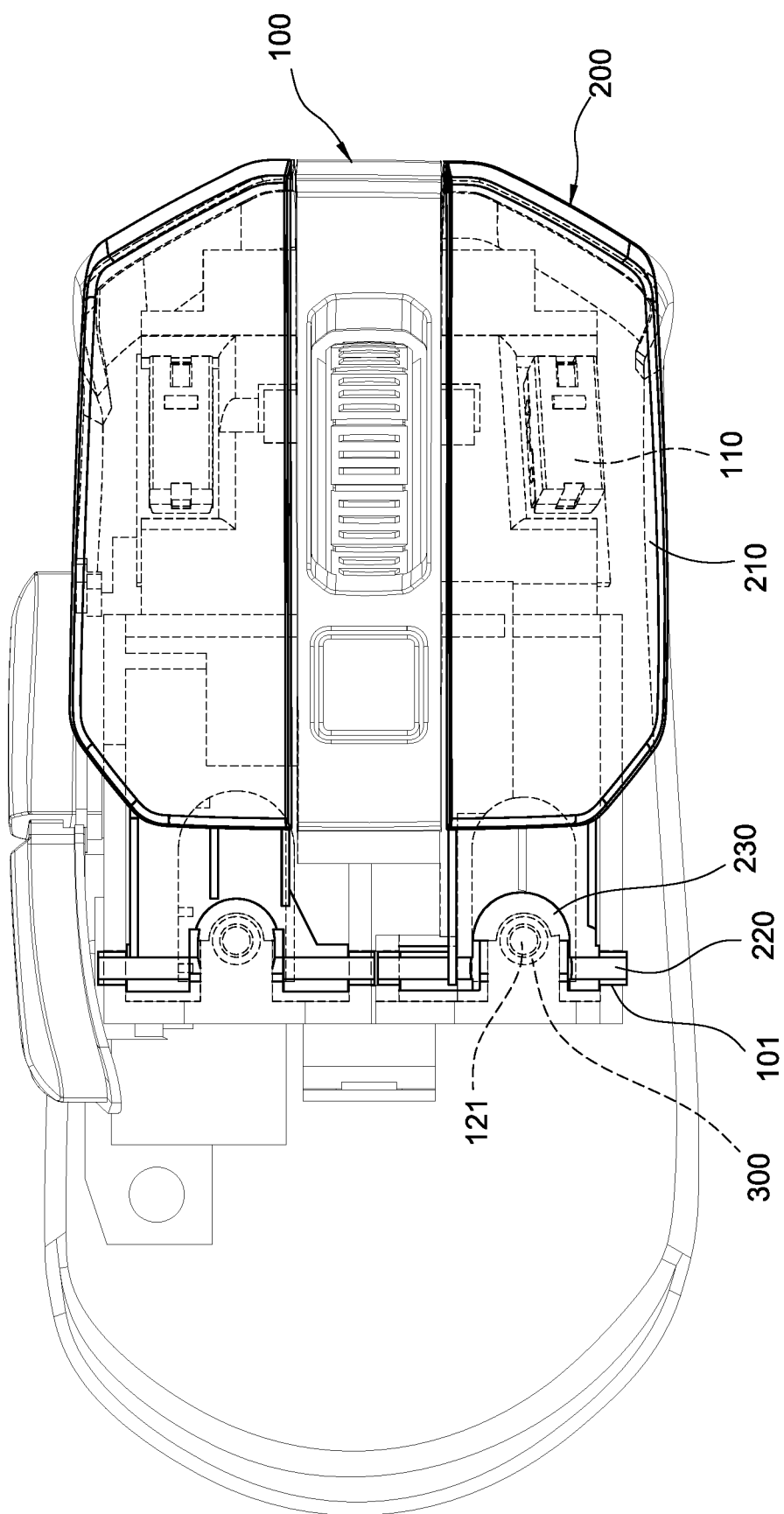
FIG. 4 is a schematic view showing the responsive mouse click mechanism of an embodiment of the present disclosure.

According to FIGS. 1 to 4, a responsive mouse click mechanism which is arranged in a mouse for triggering the mouse to send a signal by a user is provided in the present disclosure.

A responsive mouse click mechanism including a body 100, at least a key 200 and an elastic member 300 is provided in the present disclosure.

According to the present embodiment, the body 100 is preferably a plastic base and forming a part of the mouse. At least a switch 110 is arranged on the body 100, the switch could be triggered to send a control signal. According to the present embodiment, a couple of switches 110 the same with each other are preferably arranged on the body 100, and only one of the switches 110 will be described below. At least a pivotal notch 101 corresponding to the switches 110 is defined on the body 100. According to the present embodiment, a couple of pivotal notches 101 corresponding to the respective switches 110 are preferably defined on the body 100, and the two pivotal notches 101 of each couple are arranged along the same central axis. However, the number of the pivotal notch 101 should not be limited to the embodiment, single pivotal notch 101 is effect for pivoting connection.

For example, a double-key mouse including a couple of keys 200 the same as each other is shown in the embodiment of the present disclosure, and structures and motions of only one of the keys 200 will be illustrated below. However, the mouse could alternative be a single-key mouse or three-key mouse, and scope of the present disclosure should not be limited to the embodiment. The key 200 includes an extension arm 210, an end of the extension arm 210 is pivotally connected to the body 100, and the other end of the extension arm 210 is contacted with the switch 110 and allowed to be click by a user to trigger the switch 110. Preferably, a pushing block 211 is arranged protruding on a lateral surface of the extension arm 210. According to the present embodiment, the extension arm 210 is preferably an arc strip, a convex side thereof is arranged at outside of the mouse, a concave side opposite to the convex side is arranged in the mouse, and the pushing block 211 is preferably arranged on the concave side.

A pivotal shaft 220 pivotally connected to the pivotal notch 101 is arranged on an end of the extension arm 210 pivotally which is connected to the body 100, and the pivotal shaft 220 of the key 200 is therefore coincide with and the central axis of the pivoted pivotal notch 101 to form a coaxial arrangement. According to the present embodiment, a couple of pivotal shafts 220 corresponding to the aforementioned couple of pivotal notches 101 is preferably arranged on the aforementioned end of the extension arm 210 pivotally connected to the body 100, the couple of pivotal shafts 220 are arranged at interval and along the same central axis, and the respective pivotal shafts 220 are pivotally connected with the respective corresponding pivotal notches 101.

The elastic member 300 is connected between the body 100 and the extension arm 210, the elastic member 300 is arranged between the pivotal notch 101 and the switch 110, and the elastic member 300 therefore could press the extension arm 210 to load a moment on the extension arm 210, and the extension arm 210 is thereby rotated to apply a preload on the switch 110. An elastic member 300 with suitable coefficient of elasticity could be provided and the extension arm 210 thereby provide suitable elastic force to apply a preload on the switch 110 without triggering the switch 110. Specifically, the elastic member 300 is arranged between the couple of pivotal notches 101 and a contact point between the elastic member 300 and the key 200 is located between the pivotal shaft 220 and the switch 110. According to the present embodiment, the elastic member 300 is preferably arranged biased a central axis of the pivotal notch 101 toward the switch 110. Therefore, the user could trigger the switch 110 by a slight click onto the extension arm 210. Moreover, the user resists a uniform slight resistance in the click stroke (namely a resultant force of a self-resistance of the switch 110 eliminated by an elastic force caused by the elastic member 300), and the click stroke is therefore smooth.

The elastic member 300 is arranged between the pivotal notch 101 and the switch 110, and a downward pressure therefore should be loaded on the extension arm 210 extension arm 210 to cause a moment rotating toward the switch 110. In order to avoid breaking appearance of the mouse, the elastic member 300 should be located under an external surface of the mouse, a cup 230 is arranged between the pivotal shaft 220 and the other end of the extension arm 210. According to the present embodiment, the cup 230 is preferably arranged between the couple of pivotal shafts 220 and biased the central axis of the couple of pivotal shafts 220 toward aforementioned the other end of the extension arm 210. The cup 230 is entirely located at the concave side of the extension arm 210, an opening of the cup 230 is substantially located on a surface extended from the extension arm 210. The elastic member 300 is accommodated in the cup 230 to presses the internal surface of the cup 230, a pressing plate 120 is arranged on the body 100 corresponding to each cup 230, the pressing plates 120 are substantially arranged on the aforementioned surface extended from the extension arm 210 to cover the opening of the cup 230 and press the elastic member 300. According to the present embodiment, the elastic member 300 is a cylindrical spring and a pin 121 is arranged protruding from the pressing plate 120, the pin 121 is arranged toward inside of the cup 230, the pin 121 is inserted in an end of the elastic member 300 and an internal surface at bottom of the cup 230 is pressed by the other end of the elastic member 300.

Moreover, the elastic member 300 presses on the bottom of the cup 230 opposite to the opening direction of the pivotal notch 101 and thereby presses the pivotal shaft 220 into the corresponding pivotal notch 101 to fix the key 200 on the body 100.

Furthermore, the appearance of the conventional mouse is of a ball shape, the pivotal shafts 220 of the key 200 are usually not horizontal when the is placed on a horizontal plane, if an oblique pivotal hole is defined on the body 100 for pivotal connecting the key 200, and it is therefore complex to design mode or assemble parts. According to the present disclosure, the pivotal shaft 220 is pivotally connected to the pivotal notch 101 and therefore could be assembled without alignment process, and it is therefore easy to assemble parts and design mode.

Although the present disclosure has been described with reference to the foregoing preferred embodiment, it will be understood that the disclosure is not limited to the details thereof. Various equivalent variations and modifications can still occur to those skilled in this art in view of the teachings of the present disclosure. Thus, all such variations and equivalent modifications are also embraced within the scope of the present disclosure as defined in the appended claims.

What is claimed is:

1. A responsive mouse click mechanism, comprising:
   a body (100), a switch (110) being arranged on the body (100);
   a key (200), comprising an extension arm (210), an end of the extension arm (210) being pivotally connected to the body (100), the other end of the extension arm (210) being contacted with the switch (110); and
   an elastic member (300), connected between the body (100) and the extension arm (210), the elastic member (300) pressing on the extension arm (210) to cause a moment on the extension arm (210), and the extension arm (210) thereby applying a preload on the switch (110) without triggering the switch (110),
   wherein at least a couple of coaxial pivotal notches (101) is defined on the body (100), a couple of coaxial pivotal shafts (220) are arranged on an end of the extension arm (210) pivotally connected with the body (100), the couple of pivotal shafts (220) are pivotally connected to the respective pivotal notches (101), the elastic member (300) is arranged between the couple of pivotal notches (101) and a contact point between the elastic member (300) and the key (200) is located between the couple of pivotal notches (101) and the switch (110).

2. The responsive mouse click mechanism according to claim 1, wherein at least a pivotal notch (101) is defined on the body (100), a pivotal shaft (220) pivotally connected to the pivotal notch (101) is arranged on the end of the extension arm (210) pivotally connected with the body (100), and a contact point between the elastic member (300) and the key (200) is located between the pivotal notch (101) and the switch (110).

3. The responsive mouse click mechanism according to claim 2, wherein a cup (230) is arranged between the pivotal shaft (220) and the other end of the extension arm (210), the elastic member (300) is accommodated in the cup (230) to press on an internal surface of the cup (230).

4. The responsive mouse click mechanism according to claim 3, wherein a pressing plate (120) is arranged on the body (100), and the pressing plate (120) covers on an opening of the cup (230) and is pressed by the elastic member (300).

5. The responsive mouse click mechanism according to claim 4, wherein a pin (121) is arranged on the pressing plate (120), the elastic member (300) is a cylindrical spring, the pin (121) is inserted in an end of the elastic member (300) and the other end of the elastic member (300) presses on the internal surface at a bottom of the cup (230).

6. The responsive mouse click mechanism according to claim 3, wherein a bottom of the cup (230) is pushed by the elastic member (300) in a direction opposite to an opening direction of the pivotal notch (101) to press the pivotal shaft (220) into the corresponding pivotal notch (101).

7. The responsive mouse click mechanism according to claim 1, wherein a cup (230) is arranged between the couple of pivotal shafts (220), the cup (230) is arranged between the couple of pivotal shafts (220) and is arranged toward the other end of the extension arm (210) to be offset to one side of an axis of the couple of pivotal shafts (220), and the elastic member (300) is accommodated in the cup (230) and presses on an internal surface of the cup (230).

8. The responsive mouse click mechanism according to claim 7, wherein a pressing plate (120) is arranged on the body (100), and the pressing plate (120) covers an opening of the cup (230) and is pressed by the elastic member (300).

9. The responsive mouse click mechanism according to claim 8, wherein a pin (121) is arranged on the pressing plate (120), the elastic member (300) is a cylindrical spring, the pin (121) is inserted in an end of the elastic member (300) and the other end of the elastic member (300) presses on the internal surface at a bottom of the cup (230).

10. The responsive mouse click mechanism according to claim 7, wherein a bottom of the cup (230) is pushed by the elastic member (300) in a direction opposite to an opening direction of the pivotal notch (101) to press the pivotal shaft (220) into the corresponding pivotal notch (101).

11. The responsive mouse click mechanism according to claim 1, wherein a pushing block (211) for pressing the switch (110) is arranged protruding on a lateral surface of the extension arm (210).

\* \* \* \* \*